US005752010A

United States Patent [19]

Herbert

[11] Patent Number: 5,752,010

[45] Date of Patent: May 12, 1998

[54] DUAL-MODE GRAPHICS CONTROLLER WITH PREEMPTIVE VIDEO ACCESS

[75] Inventor: Brian K. Herbert, Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 119,295

[22] Filed: Sep. 10, 1993

[51] Int. Cl.[6] .......... G06T 1/60

[52] U.S. Cl. .......... 395/509; 395/503; 395/515; 395/521; 395/478

[58] Field of Search .......... 395/153, 154, 395/162–166, 163, 425, 401, 432, 474–485, 821–824, 850–871, 503, 507, 509, 512, 515, 520, 521, 524, 526; 345/115, 119

[56] References Cited

U.S. PATENT DOCUMENTS

| | | | |
|---|---|---|---|
| 4,439,760 | 3/1984 | Fleming | 340/799 |
| 4,550,315 | 10/1985 | Bass et al. | 340/703 |
| 4,868,557 | 9/1989 | Perlman | 340/799 |
| 4,928,253 | 5/1990 | Yamauchi et al. | 364/521 |
| 4,954,818 | 9/1990 | Nakane et al. | 340/721 |
| 5,170,154 | 12/1992 | Mantopoulos et al. | 340/723 |
| 5,245,322 | 9/1993 | Dimwiddie, Jr. et al. | 395/115 |
| 5,264,837 | 11/1993 | Buehler | 345/115 |
| 5,276,437 | 1/1994 | Horvath et al. | 345/119 |

OTHER PUBLICATIONS

Ron Wilson and Junko Yoshida, "Competing Spec Comes As A Surprise—Intel, ATI in race against VESA bus", Electronic Engineering Times, Aug. 9, 1993.

K. M. Chang et al. "A network Interface for Real-Time Video Services on a High-Speed Multimedia LAN", ICCS/ISITA '92, 1992.

Brian Case, "Windows NT Offers RISC a Choice on the desktop: SDK release to Crowd of over 4500 @developer's Conference", Microprocessor Report, V6, N10, P1(5), Jul. 29, 1992.

K.M. Chang et al. "A Network Interface for Real-Time Video Services on a High-Speed Multimedia LAN", IEEE, ICCS/ISITA, 1992, pp. 16–19.

*Primary Examiner*—Mark R. Powell
*Assistant Examiner*—U. Chauhan
*Attorney, Agent, or Firm*—Wayne P. Bailey

[57] ABSTRACT

A method and architecture for a graphics controller chip. The graphics controller has a display memory for storing video and graphics data. It also has a logic controller, connected to the memory, for performing logic operations on data stored in the memory. Video and graphics data is made available to the graphics controller at a single access port. The graphics controller also has an address range detector for checking the address of the data provided to the port and for disabling logical operations of the logic controller when the address indicates the presence of video data. The video data is thereafter transferred to the display memory on a priority basis.

17 Claims, 3 Drawing Sheets

DUAL-MODE GRAPHICS CONTROLLER WITH PREEMPTIVE VIDEO ACCESS

The present invention relates to computer systems having the ability to display both graphics and video data. More particularly, it relates to a graphics controller for such computer systems.

BACKGROUND OF THE INVENTION

The phrase "graphics data" refers to data which when reproduced on a display screen is relatively time independent. For example, graphics data includes text from a word processor and drawings from a spreadsheet application. The phrase "video data" refers to data which when reproduced on a display screen is time dependent. For example, video data includes television images.

It has been known for some time how to display either video data or graphic data on a display screen. For example, a personal computer (PC) displays graphics data, and a television set displays video data images. In recent years, development work has been done on merging the two technologies. Such a merger might take the form of a computer display screen with graphics data displayed in one region of the screen at the same time a video picture is displayed in another region or window of the screen.

The merger of video and graphics data in the same medium is a form of what is sometimes referred to as "multimedia." Multimedia systems are more complex than systems dealing with only one kind of data because of different characteristics and requirements of the various data types. For example, displays of video data are very sensitive to interruptions of data to the screen. Even short delays in receiving video data can result in choppy images. Similarly, audio reproduction, which often accompanies a video display, is sensitive to interruptions in data. Interruptions in audio data are manifest by pops, clicks or other annoying sounds. In contrast, graphics data is not as sensitive to minor delays in being displayed. However, when the delays to transmitting or displaying graphics data cause the CPU in a computer to be delayed, system performance can be adversely affected.

Another difficulty PC's have had in incorporating video data is the relatively high volume of data required for video as opposed to graphics data.

In a conventional PC architecture for handling multimedia applications, all data must be transmitted through a graphics controller. One solution to the requirements for handling the high volume of video data is to provide two access ports on the graphics controller. One port is connected to a standard PC bus and the other port is connected to a video processor. The graphics port receives only graphics data and the video port receives only video data. With dedicated ports for video and graphics data, the transfer of video data can improve system performance.

However, a disadvantage of the two port approach is the requirement for additional pins on the graphics controller. Particularly as graphics controllers shrink in size, the additional pin count becomes difficult to achieve. Further disadvantages of the two port approach are the requirements for extra signal lines and logic control elements such as buffers and multiplexers —all of which result in increased costs.

A further disadvantage of a dual port solution is the lack of a standard configuration for the second port. This means that the dual port graphics card and video processor are sold as a pair with the video connection based on a proprietary, nonstandard configuration. This reduces options for the buyer and can result in increased costs.

OBJECTS OF THE INVENTION

It is therefore an object of the present invention to provide a new and improved graphics controller for a computer.

It is another object of the present invention to provide a new and improved method for providing a regular flow of video data to a display.

It is a further object of the present invention to provide a new and improved architecture for a multimedia computer system.

It is yet another object of the present invention to provide a graphics controller for a multimedia computer system having a reduced number of I/O pins.

It is yet a further object of the present invention to provide a method and system for displaying video and graphics data on the same screen.

It is still another object of the present invention to provide a method and system for simultaneously displaying audio/video and graphics data where the audio sounds clear and the video images appear smooth.

It is still another object of the present invention to provide an architecture which enables the production of smooth video and clear audio signals across an industry standard local bus.

It is an additional object of the present invention to provide an architecture which allows video and audio upgrades with industry standard video and audio control boards.

SUMMARY OF THE INVENTION

One form of the present invention is an architecture for a graphics controller chip. The graphics controller has a display memory for storing video and graphics data. It also has a logic controller, connected to the memory, for performing logic operations on data stored in the memory. Video and graphics data is made available to the graphics controller at a single access port. The graphics controller also has an address range detector, connected to the port and logic controller, for comparing the address of the data provided to the port with a first address range and for interrupting the logic operations of the logic controller when the address is within the first range.

Another form of the present invention is a method of providing data to the display memory. The method involves distinguishing between video and graphics data on the basis of the address of the data, and then disabling other logical operations on data in the display memory to allow for the priority transfer of video data to the display memory.

Yet another form of the present invention is a method of reducing interruptions in a flow of video data from a bus to a display memory in a computer system in which both video data and graphics data are transferred from the bus to the display memory. The method involves determining if video data is present on the bus, and then providing a higher priority to the transfer of video data from the bus to the display memory than to logical operations on graphics data in the display memory.

DESCRIPTION OF A PREFERRED EMBODIMENT

Figure 1:
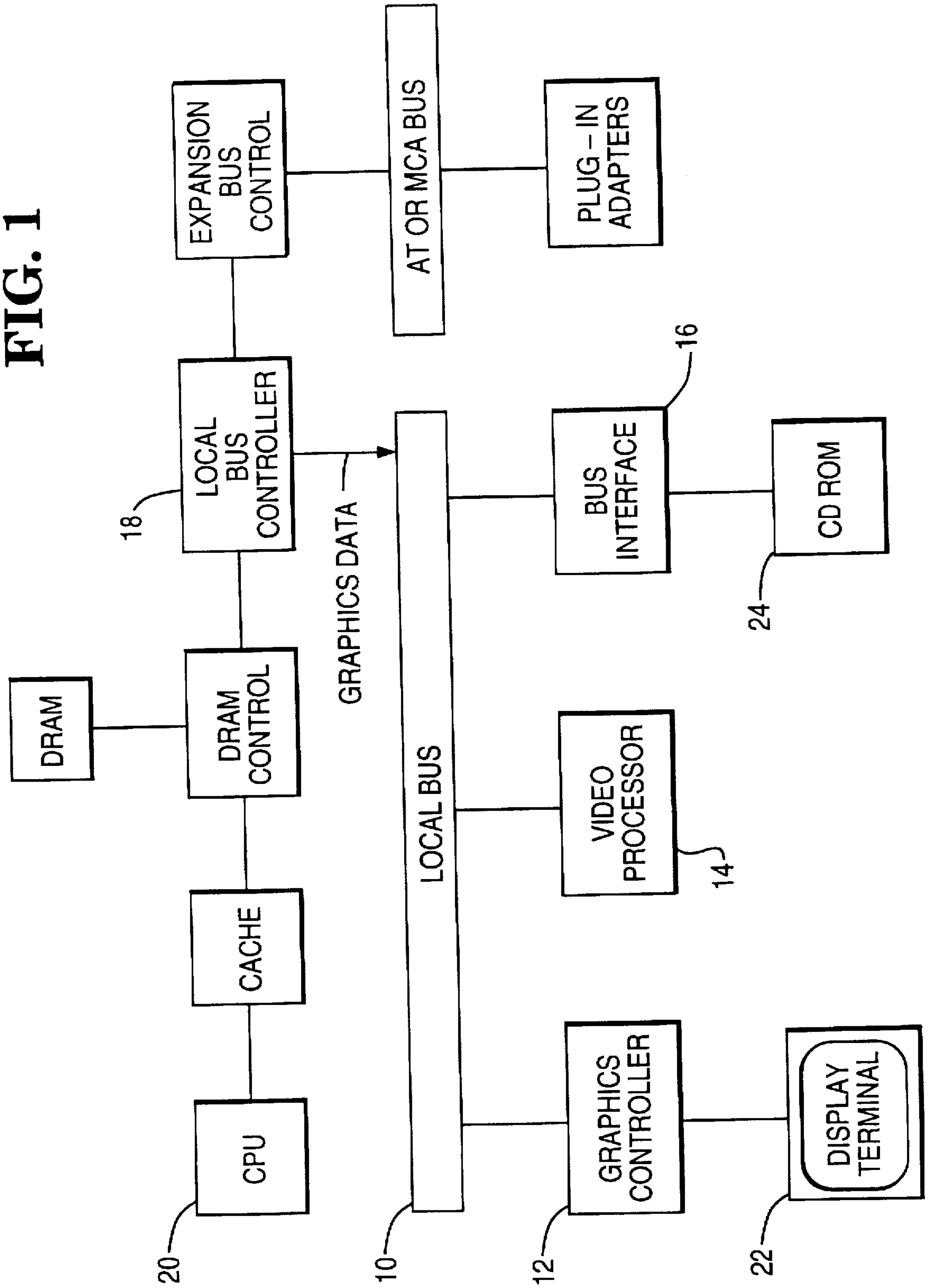
FIG. 1 is an architecture for a multimedia computer system embodying one form of the present invention.

FIG. 1 shows a PC architecture which implements one form of the present invention. A local bus 10 has address, data and control lines. A graphics controller 12, video processor 14, bus interface 16 and local bus controller 18 are each connected to local bus 10.

Data generated under the control of CPU 20 is referred to herein as "graphics" data. Graphics data includes data such as may be made available through a spread sheet, word processor, or other typical PC software application. Graphics data is transferred through local bus controller 18 and local bus 10 to graphics controller 12 for display on display terminal 22.

Data of a time sensitive nature is referred to herein as "video" data. Video data includes not only moving pictures such as available from a TV signal or CD ROM but also audio signals. An illustrative source of video signals is shown in FIG. 1 as CD ROM 24, which is connected to local bus 10 through bus interface 16. Video processor 14 provides auxiliary services to the video data transferred from CD ROM 24. For example, video processor 14 can scale the data to size the image, assign addresses to the data, etc.

An important feature of the subject invention is that both graphics and video data are transferred to graphics controller 12 over local bus 10. Although graphics and video data must time share local bus 10, i.e., only graphics or video data can be transferred over local bus 10 at any given time, the present invention allows a smooth flow of video data to display terminal 22. This will be described below.

Figure 2:
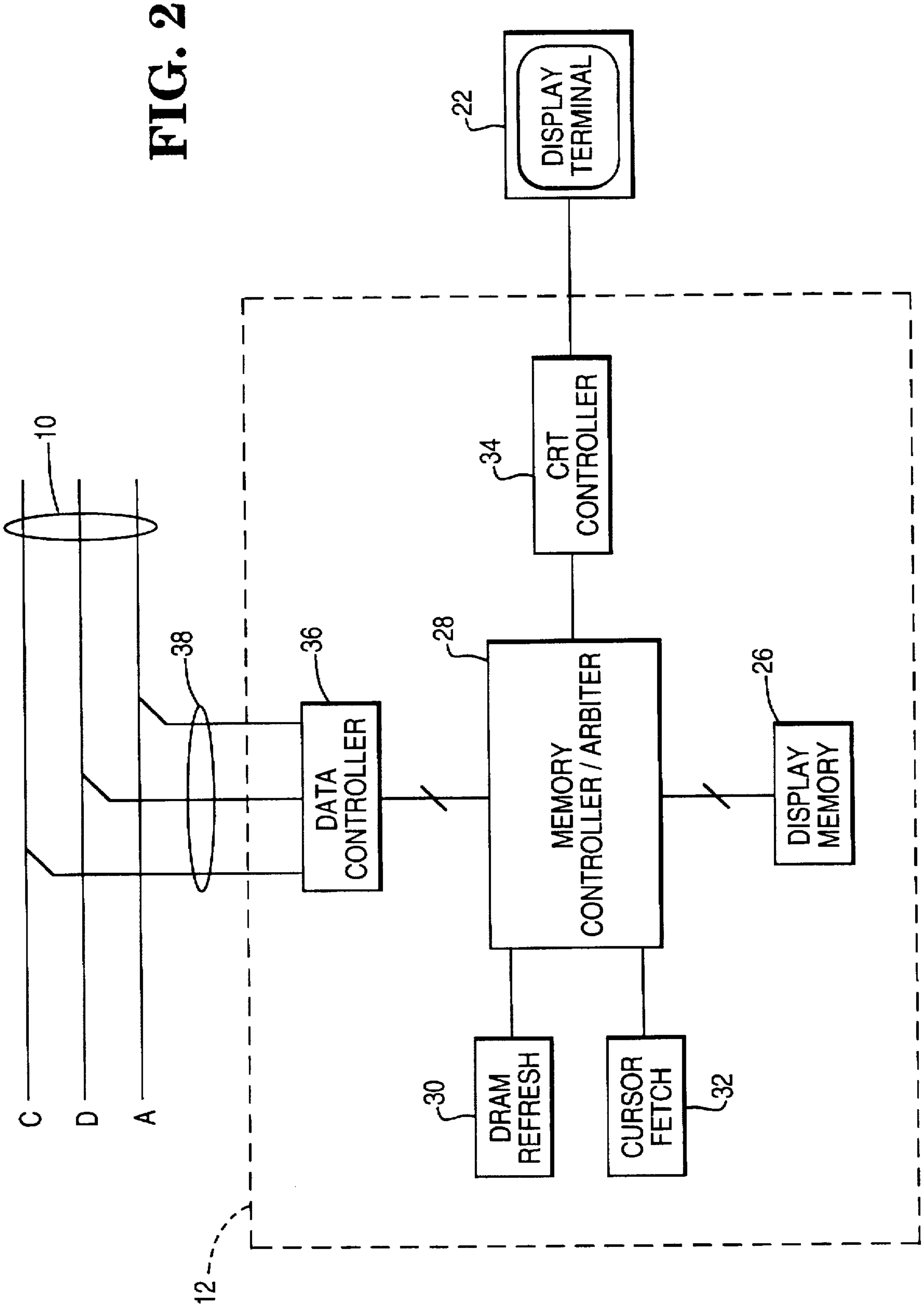
FIG. 2 is a block diagram of the graphics controller shown in FIG. 1.

FIG. 2 shows more detail of graphics controller 12. Graphics controller 12 includes a display memory 26 which stores both graphics and video data. Display memory 26 is connected to memory controller/arbiter 28 which controls access to memory 26 by arbitrating among requests from various devices. For example, DRAM refresh 30, cursor fetch 32, CRT controller 34 and data controller 36 are all connected to memory controller/arbiter 28 which selectively grants access to display memory 26 by arbitrating among their requests. Data controller 36 has an access port 38 for connection to local bus 10. The connection to display terminal 22 is through CRT controller 34.

Figure 3:
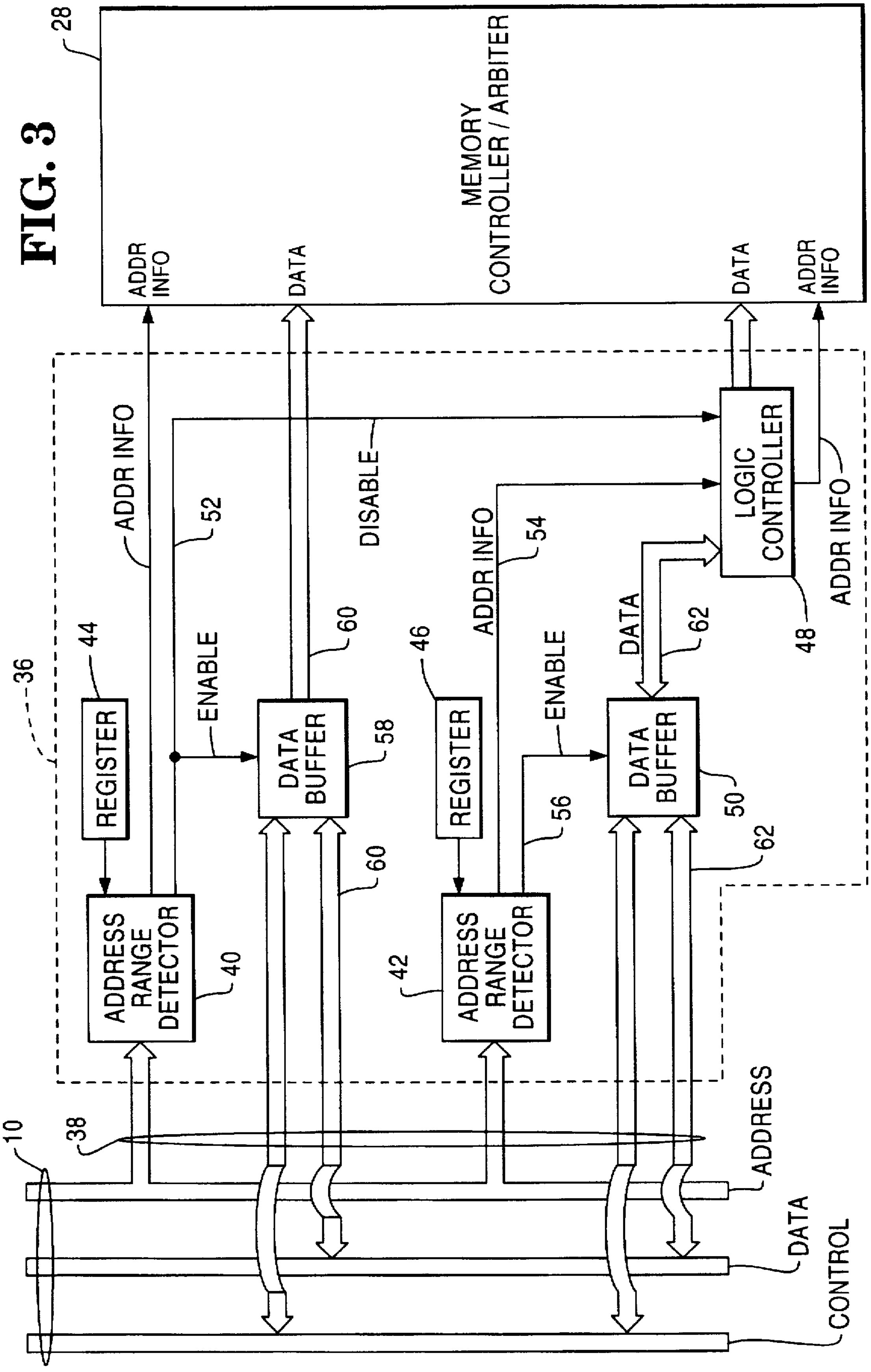
FIG. 3 is a block diagram of the data controller shown in FIG. 2.

FIG. 3 shows more detail of data controller 36. Data controller 36 includes address range detector 40 and address range detector 42. Address range detector 40 is connected to port 38, register 44, data buffer 58, logic controller 48 and memory controller/arbiter 28. Address range detector 42 is connected to port 38, register 46, logic controller 48 and data buffer 50. Each of registers 44 and 46 store values representing a predetermined range of addresses. Register 44 stores values which define the address range assigned to video data, and register 46 stores values which define the address range assigned to graphics data. For example, register 46 might store low and high address values of A0000 (hexadecimal) and AFFFF, respectively. These values correspond to the typical address range for IBM compatible VGA devices operating in a color graphics mode. Register 44 can be provided with low and high values which define another address range. Typically, this range would be mapped above 1 MB in IBM PC implementations operating in protected mode (and could be mapped in the upper part of the B segment for real mode operation with color display graphics cards) to avoid overlap with other predefined address ranges.

Address range detector 40 only responds to an address on bus 10 when the address falls within the range defined by the values stored in register 44. Similarly, address range detector 42 only responds to an address on bus 10 when the address falls within the range defined by the values stored in register 46. A feature of the present invention is that the address range values stored in registers 44 and 46 are programmable, meaning that they can be redefined by the user of the PC.

Data controller 36 further includes a logic controller 48. Logic controller 48 is connected to a data buffer 50 and is also connected to display memory 26 through memory controller/arbiter 28. In a preferred embodiment, logic controller 48 is a block level transfer (BLT) engine. A primary function of the BLT engine is to perform logic operations on data stored in display memory 26. For example, the BLT engine can perform AND, OR and other logic functions on data in display memory 26, and it can aid in drawing operations like saving background data and moving data between active and off screen areas of memory.

Logic controller 48 is connected to address range detector 40 by a disable line 52. Line 52 transmits a disable signal from address range detector 40 to logic controller 48 whenever the address of data at port 38 falls within its range, i.e., whenever the data at port 38 is video data. Logic controller 48 is also connected to address range detector 42 by an ADDR_INFO line 54. In addition, data buffer 50 is connected to address range detector 42 by enable line 56.

Data controller 36 has a data path 60 connected between port 38 and display memory 26. Data buffer 58 is disposed within data path 58 and temporarily stores data received from port 38 while its address is compared in address range detector 40. Memory controller/arbiter 28 selectively connects data path 60 with display memory 26 based on the result of its arbitration. Data path 60 transmits data having an address within the range of address range detector 40, i.e., video data.

Data controller 36 also includes a data path 62 connected between port 38 and logic controller 48 through data buffer 50. Data buffer 50 temporarily stores data received from port 38 while its address is compared in address range detector 42. Data path 62 transmits data having an address within the range of address range detector 42, i.e., graphics data.

In operation, the architecture of the present invention has been designed so that local bus 10 may transmit both video and graphics data. The user or programmer of the PC will normally define a first address range for video data and a second, non-overlapping, address range for graphics data. Typically, the first range is defined by lower and upper address values, and these values are provided to register 44 for use by address range detector 40. Similarly, the second range is also defined by lower and upper address values, and these values are provided to register 46 for use by address range detector 42.

Whenever graphics data is provided over bus 10, the graphics data is temporarily stored in data buffer 50 while its address is checked in address range detector 42. An enable signal is then sent from detector 42 over line 56 to data buffer 50 to transfer the graphics data to logic controller 48. Logic controller 48 will make a request to memory controller/arbiter 28 for access to display memory 26. When granted access to display memory 26, logic controller 48 will either transfer the graphics data directly to display memory 26 or perform some logical operation on the graphics data, perhaps in conjunction with data previously in display memory 26. For example, logic controller 48 may logically AND the new data with data previously stored in display memory 26 and transfer the resulting data to display memory 26.

Whenever video data is provided over bus 10, the video data is temporarily stored in data buffer 58 while its address is checked in address range detector 40. An enable signal is then sent from detector 40 over line 52 to data buffer 58 to transfer the video data to display memory 26. When memory controller/arbiter 28 grants access to display memory 26, the video data is transferred directly to display memory 26.

Logic controller 48 can also be instructed to perform logic operations on data in display memory 26 without receiving new graphics data from bus 10. For example, it can move data from active screen areas to off-screen areas, change colors, etc. The operation of logic controller 48, particularly in its embodiment as a BLT engine, is a particularly efficient way of manipulating data to be displayed on the display terminal.

A feature of the present invention is the priority scheme of memory operations. For example, assume logic controller 48 has commenced a logic operation on data in display memory 26 and video data is thereafter transferred over bus 10. The video data on bus 10 is identified by address range detector 40. Detector 40 then transmits a disable signal over line 52 to logic controller 48 to interrupt its logic operations. Memory controller/arbiter 28 then grants access to display memory 26 and the video data is transferred directly to display memory 26.

In contrast, the receipt of graphics data over bus 10 does not result in an interruption of logic operations being performed by logic controller 48 on data in display memory 26. Rather, the graphics data is stored in a temporary store in controller 48 until the logic operation is complete.

In summary, the present invention provides both an architecture and method for providing a regular flow of video data from local bus 10 to display memory 26. Address range detectors 40 and 42 distinguish between video and graphics data on the basis of the address of the data on bus 10. Whenever video data is detected by detector 40, logic operations of logic controller 48 are halted or disabled and the video data is granted priority for its transfer to display memory 26. This priority amounts to an interrupt priority over other logical operations on data in display memory 26.

It will be clear to those skilled in the art that the present invention is not limited to the specific embodiment disclosed and illustrated herein.

Numerous modifications, variations, and full and partial equivalents can be undertaken without departing from the invention as limited only by the spirit and scope of the appended claims.

What is desired to be secured by Letters Patent is as follows.

What is claimed is:

1. In a computer system having:

A) a local bus for transmitting both video and graphics data;

B) a display terminal; and

C) a graphics controller, connected between said local bus and terminal, including a display memory for storing video data and graphics data for said display terminal;

a method of providing new data to said display memory, the method comprising the steps of:

a) defining an address range for said video data;

b) commencing a logic operation on existing data stored in said display memory;

c) transmitting said new data over said local bus to said graphics controller;

d) checking an address of said new data to determine whether the address falls within said address range; and e) interrupting said logic operation when the address falls within said address range, and transferring said new data directly to said display memory.

2. The method of claim 1, wherein said defining step includes defining a second address range for said graphics data.

3. The method of claim 2, wherein said checking step includes checking the address of said transmitted data to determine whether it falls within said second address range.

4. The method of claim 3, further comprising:

whenever the transmitted data is graphics data, storing said graphics data in said graphics controller at a location other than the location of said display memory until said logic operation is completed.

5. The method of claim 1 wherein said graphics controller includes a logic controller for performing said logic operation; and wherein said interrupting step includes providing a disable signal to said logic controller to interrupt said logic operation.

6. The method of claim 1 wherein said graphics controller includes a register and wherein said defining step includes providing said register with values which define said first range.

7. A method of providing data from a local bus of a computer to a display memory, the method comprising the steps of:

distinguishing between video and graphics data on said local bus by examining an address of the data; and disabling logical operations from being performed on data in said display memory to allow for priority transfer of video data to said display memory.

8. A graphics controller comprising:

a) a display memory;

b) a logic controller, connected to said memory, for performing logic operations on data stored in said memory;

c) an access port connected to an external address/data bus; and d) an address range detector, connected to said access port and logic controller, for comparing an address of data provided to said access port with an address range and for interrupting logic operations of said logic controller when the address is within the address range.

9. The graphics controller of claim 8 wherein:

the external data bus transmits both graphics and video data;

said address range is assigned to said video data; and said graphics controller further comprises:

e) a path for transmitting video data directly from said port to said display memory when the logic operations of said logic controller are interrupted.

10. A graphics controller comprising:

a) a data controller having a port for connection to a local bus;

b) a display memory; and c) a memory controller/arbiter connected between said data controller and display memory;

wherein said data controller includes:

i) a logic controller for performing logic operations on data stored in said memory; and ii) an address range detector, connected to said port and logic controller, for comparing an address of data provided to said port with an address range and for interrupting the logic operations of said logic controller when the address is within the address range.

11. The graphics controller of claim 10 wherein said data controller further includes:

iii) a first data path, connected between said port and said memory, for transmitting data having an address within said first address range from said port to said memory.

12. The graphics controller of claim 11 wherein said data controller further includes:

iv) a second address range detector, connected between said port and logic controller, for comparing an address of data provided to said port with a second address range; and v) a second data path, connected between said port and said logic controller, for transmitting data having an address within said second address range from said port to said logic controller.

13. The graphics controller of claim 12 wherein said first and second paths include first and second data buffers, respectively, for temporarily storing data received from said port while the address is compared in at least one of the first and second address range detectors.

14. The graphics controller of claim 13 wherein said data controller further includes:

vi) a disable line connected between said first address range detector and logic controller for providing a disable signal from said first address range detector to said logic controller whenever the address of data provided to said port falls within said first address range.

15. A graphics controller comprising:

a) a display memory;

b) means for distinguishing between video and graphics data on the basis of an address of the data; and c) means, connected between said memory and distinguishing means, for disabling logical operations from being performed on data in said display memory to allow for priority transfer of video data to said display memory.

16. A method of reducing interruptions in a flow of video data from a bus to a display memory in a computer system in which video data and graphics data are transferred from the bus to the display memory, comprising the steps of:

determining if video data is present on the bus; and providing a higher priority to the transfer of video data from the bus to the display memory than to logical operations on graphics data in the display memory.

17. The method of claim 16 wherein said determining step includes identifying video data on the basis of the address of the data on the bus.

* * * * *